Oct. 21, 1947.  F. M. ASPIN  2,429,304
ROTARY VALVE ASSEMBLY FOR INTERNAL-COMBUSTION
ENGINES, COMPRESSORS, AND THE LIKE
Filed March 23, 1944  2 Sheets-Sheet 1

INVENTOR:
Frank Metcalf Aspin
By Attorney: Walter Gunn

Oct. 21, 1947.    F. M. ASPIN    2,429,304
ROTARY VALVE ASSEMBLY FOR INTERNAL-COMBUSTION
ENGINES, COMPRESSORS, AND THE LIKE
Filed March 23, 1944    2 Sheets-Sheet 2

INVENTOR.
FRANK METCALF ASPIN
BY
ATTORNEY

Patented Oct. 21, 1947

2,429,304

UNITED STATES PATENT OFFICE 2,429,304

ROTARY VALVE ASSEMBLY FOR INTERNAL-COMBUSTION ENGINES, COMPRESSORS, AND THE LIKE

Frank Metcalf Aspin, Bury, England

Application March 23, 1944, Serial No. 527,762
In Great Britain March 11, 1943

Section 1, Public Law 690, August 8, 1946.
Patent expires March 11, 1963

13 Claims. (Cl. 123—80)

1

This invention relates to rotary valve assemblies for internal combustion engines compressors and the like of the kind having a valve member rotatably mounted in a housing, with complementary tapered gas-sealing and bearing surfaces on the valve member and in the housing, said valve member having a combined combustion chamber and through passage, one end of which passage is at the end of the valve member and is always open to the cylinder and the other end of which passage is located at the said tapered surface and co-operates with a port in the complementary tapered surface of the housing.

An internal combustion engine of the kind aforesaid is described in the specification of my Patent No. 2,283,594 from which the present invention has been developed.

Research and development of the engine of the earlier patent aforesaid has resulted in the appreciation of certain problems connected directly with the construction of the rotary valve member and its housing. Several inventions of the present applicant relating to such developments are already the subject of patents or co-pending applications for patents.

The present invention is concerned with the problem of pressures at the complementary tapered surfaces, and the allied problem of lubrication and gas sealing, in combination with such problems as combustion chamber form, port areas, flame control, detonation control, etc.

Obviously the pressure at the said tapered surfaces is proportional to the area of that end of the rotatable valve member which is exposed to gaseous pressure within the cylinder. In the construction of engine according to the said earlier Patent No. 2,283,594 substantially the whole area of the end of the valve member is thus exposed. At the same time it must be remembered that such pressure not only fluctuates and in an internal combustion engine reaches a peak value during the combustion phase, but there is a complete pressure reversal during the induction phase. Such pressure variations are the greater because of the higher compression ratios which can be employed with such engines, compared with compression ratios previously considered normal. (Also combustion chamber form and flame and detonation control become correspondingly more important with the increase of combustion pressure.)

According to the invention a rotary valve assembly for an internal combustion engine compressor or the like comprises a valve housing located at the end of the engine cylinder and a

2 rotary valve member mounted in the said housing, the said rotary valve member and housing having complementary tapered gas-sealing and bearing surfaces, said rotary valve member also having a through passage, one end of which passage is at the end of the valve member and is always open to the cylinder and the other end of which passage is located at the said tapered surface and co-operates with a port in the complementary tapered surface of the housing, the engine cylinder having an end wall with an opening towards the rotary valve member which is smaller than the adjacent end of the said rotary valve member and the area of which opening is substantially the area swept by the end of the passage in the said rotary valve member and is offset relative to the axis of the cylinder.

According to one embodiment of the invention an internal combustion engine compressor or the like of the kind referred to is characterised by a baffle member located between the valve member and the cylinder to shield the adjacent end of the valve member from a substantial part or the whole of the area of the end of the cylinder not swept by the end of the passage in the valve member, such baffle means being off-set relative to the axis of the cylinder.

According to further features of the invention the internal combustion engine may be further characterised in that the direction of off-setting is towards the originating location of ignition; or in internal combustion engines or the like the construction may be further characterised in that the end of the passage in the valve member which is open towards the cylinder is concentric with the axis of rotation of the valve member; in that the cylinder opening towards the valve member is the same size as and concentric with the adjacent end of the passage in the valve member; in that the cylinder has an end wall in which is located the opening towards the valve member; in that the said end wall is formed in a part which is separable from the cylinder; in that the said end wall of the cylinder is provided with cooling means, which may be an internal cooling space and into which a cooling fluid, gaseous or liquid, may be admitted preferably with a directional factor towards the cylinder for increased contact with the heat-conducting wall of the said passage; in that the separable part, or at least that portion of it forming the end wall of the cylinder is made of metal of high heat conductivity; and in that a sealing ring is provided close to the opening in the valve member so as to perform the dual function of restricting the spread of gaseous pressure to the surrounding area of the end of the valve member and of checking loss of lubricant from such surrounding area.

In the accompanying drawings constituting a part hereof, and in which like reference characters indicate like parts, Fig. 1 is a sectional elevation of part of an internal combustion engine constructed according to one example of the invention; taken along line B—C—C of Fig. 2;

Figure 1:
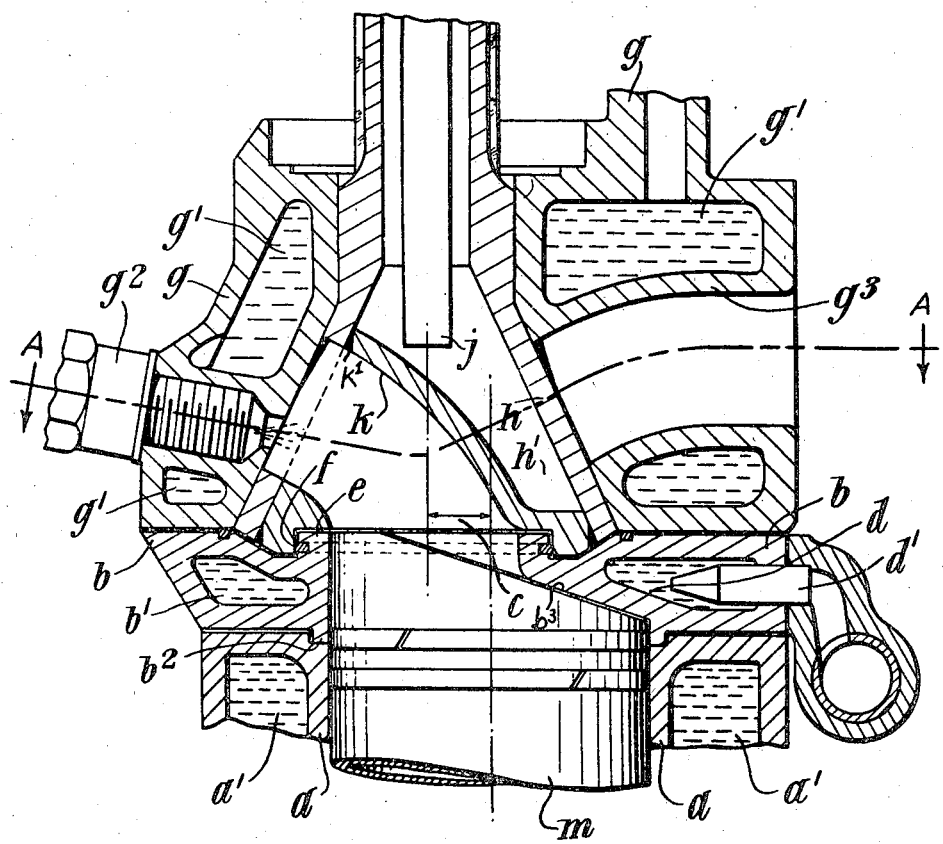
Figure 2:
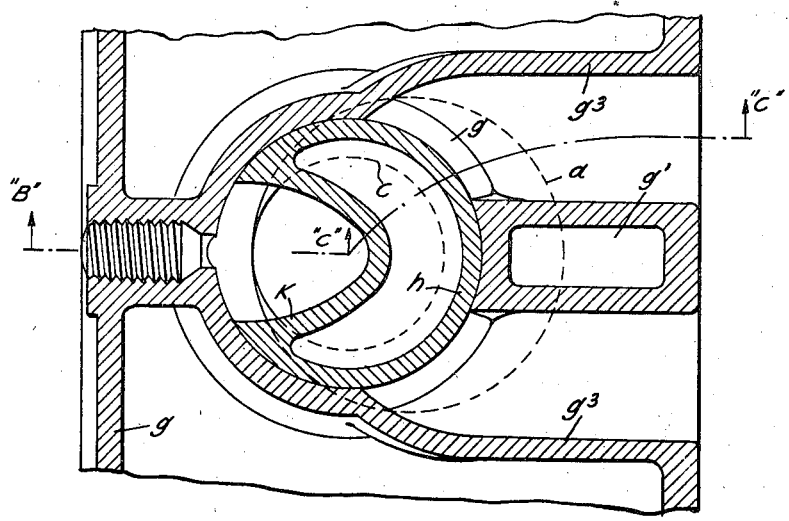
Fig. 2 is a horizontal cross-sectional view taken along line A—A of Fig. 1.
Figure 3:
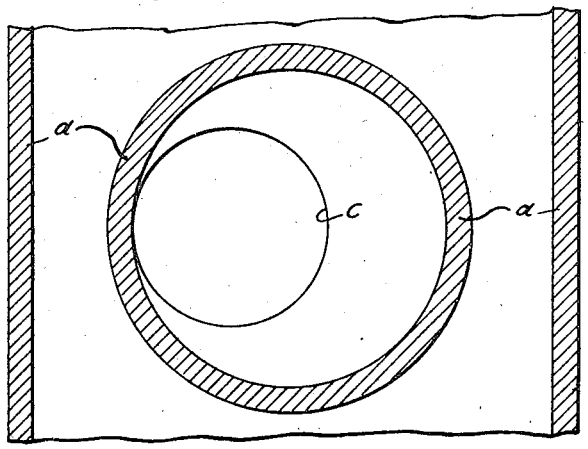
Fig. 3 is a view, taken from below, of Fig. 1, the piston having been omitted for clearness.

As shown in the drawing the upper end only of the cylinder $a$ is shown and has a liquid cooling space $a^1$. On the end of the cylinder is a separable cylinder head part $b$ having its own internal cooling fluid space $b^1$ such part being located concentrically on the cylinder by an annular flange $b^2$. Adjacent such flange $b^2$ the cylinder head part has a bore which is concentric with the cylinder bore. At its opposite face there is an outlet $c$ which is off-set so that in the diameter on which the section is taken lie the axis of the cylinder bore and of such outlet $c$. The larger bore is extended into the part so as to leave an inclined cylinder end wall $b^3$ which viewed from within the cylinder will be crescent shaped. At the widest point of such inclined end wall of the cylinder head part $b$ the fluid cooling space is brought in to provide extra cooling area at $d$ whilst directed immediately on to such area $d$ is a jet $d^1$ by which the cooling fluid is introduced to the space $b^1$ so as to give extra effective cooling at such area. Around the outlet $c$ is an upstanding flange $e$ concentric with the outlet and grooved to hold a sealing ring $f$.

Against the cylinder head part $b$ is the housing $g$ for the rotary conical valve member $h$. The housing has internal liquid cooling spaces $g^1$ and on the section shown is adapted to receive a sparking plug $g^2$. The inlet conduit $g^3$ is also seen where it passes through the cooling fluid space $g^1$ from the inlet port opening at the conical bearing surface. For convenience the conduit $g^3$ is shown in section and diametrically opposite to the sparking plug, which is obviously not its true relative position.

The rotary valve $h$ has an internal cooling space $h^1$ into which cooling fluid, liquid or gaseous, may be introduced to impinge against the wall of a passage $k$ leading from the conical wall of the valve to the end of the valve where its opening is concentric with the axis of the conical surface of the valve. The parts $h$ and $k$ are permanently united as by welding or brazing $k^1$. The underside of the valve is formed with a recess, complementary to the flange $e$ and engaged by the sealing ring $f$. Clearance space is provided to permit the valve to move downward axially away from its seating to compensate for expansion differences and because slight axial movement is desirable to help maintain the film of lubricant at the conical bearing and gas sealing surfaces.

The piston $m$, of which the upper end only is shown has an inclined top, part of which, when the piston is at the top of its stroke, as shown, is complementary to the inclined end wall of the cylinder leaving only a thin space which is of considerable importance in controlling detonation.

In operation, the part $b$ with its off-set opening smaller than the end of the valve member and of the same area and concentric with the lower end of the passage in the valve member, provides a baffle effect which reduces the area of the valve exposed to the cylinder pressures. At high speeds the thin clearance area between the end of the flange $c$ and the valve will offer sufficient resistance to the access of gaseous pressure so that only an average pressure and not peak pressures can obtain in such clearance space. The gas sealing ring $f$ limits the spread of any gas pressures which reach the clearance space. Thus, for all practical purposes, all the end of the valve member except that including the end of the passage therein, is shielded from the cylinder pressures. As the end of the passage in the valve member is concentric with the axis of rotation of the valve, the area of the opening is also the area swept by such end of the passage. The sealing ring also operates to prevent reverse or induction reduced pressures from drawing lubricant from the area surrounding the end of the valve outside such ring, which ring therefore performs a dual function.

The off-setting of the outlet $c$ towards the ignition means increases the length of the detonation zone between the end of the piston and the complementary shape of the end wall of the cylinder and intensive cooling is provided therefor by the cooling wall $d$ and the cooling jet $d^1$ directed thereon.

This construction provides considerable possibilities of variation of shape for the piston head and cylinder end wall for obtaining optimum flame and detonation control according to requirements of any particular engine.

By introducing the separate part $b$ between the end of the cylinder and the valve housing, such part may easily be made of a metal of high conductivity providing still better temperature control, which is a main factor in detonation control.

By shielding a substantial portion of the end of the valve from gaseous pressures in the cylinder not only are the bearing loads reduced but also the valve member may be made larger in diameter with certain obvious advantages and without the disadvantage of proportional increase of axial pressures on the valve.

In addition to the advantages already explained such as reducing bearing pressures at the conical surface of the valve; enabling larger valves to be used; extending the detonation zone at the end of the flame travel due to off-setting and intensive temperature control at such detonation zone the construction provides for example that the drive for the rotors may be brought nearer to the centre line of the cylinders.

Obviously the invention is not limited to all the details of the constructions above described, many of which may be modified without departing from the nature of the invention.

What I claim is:

1. A rotary valve assembly for an internal combustion engine compressor or the like comprising a valve housing located at the end of the engine cylinder and a rotary valve member mounted in the said housing, the said rotary valve member and housing having complementary tapered gas-sealing and bearing surfaces, said rotary valve member also having a through passage, said passage comprising substantially all of the combustion chamber of the engine when the piston is at its head-end dead-center position, one end of which passage is at the end of the valve member and is always open to the cylinder and the other end of which passage is located at the said tapered surface and co-operates with a port in the complementary tapered surface of the housing, the engine cylinder having an end wall with an opening towards the rotary valve member which is smaller than the adjacent end of the said rotary valve member and the area of which opening is substantially the area swept by the end of the passage in the said rotary valve member and is off-set relative to the axis of the cylinder.

2. A rotary valve assembly for an internal combustion engine compressor or the like comprising a valve housing located at the end of the engine cylinder, a rotary valve member mounted in the said housing, the said rotary valve member and housing having complementary tapered gas-sealing and bearing surfaces, said rotary valve member also having a through passage, said passage comprising substantially all of the combustion chamber of the engine when the piston is at its head-end dead-center position, one end of which passage is at the end of the valve member and is always open to the cylinder and the other end of which passage is located at the said tapered surface and co-operates with a port in the complementary tapered surface of the housing and a baffle member adapted to be secured to the cylinder and forming the said end wall of the cylinder and having an opening towards the rotary valve member which is smaller than the adjacent end of the said rotary valve member and the area of which opening is substantially the area swept by the end of the passage in the said rotary valve member and is off-set relative to the axis of the cylinder.

3. A rotary valve assembly for an internal combustion engine comprising a valve housing located at the end of the engine cylinder, a rotary valve member mounted in the said housing, the said rotary valve member and housing having complementary tapered gas-sealing and bearing surfaces, said rotary valve member also having a through passage, one end of which passage is at the end of the valve member and is always open to the cylinder and the other end of which passage is located at the said tapered surface and co-operates with a port in the complementary tapered surface of the housing, the engine cylinder having an end wall with an opening towards the rotary valve member which is smaller than the adjacent end of the said rotary valve member and the area of which opening is substantially the area swept by the end of the passage in the said rotary valve member and is off-set relative to the axis of the cylinder, means for originating ignition located in the housing and adapted to be uncovered by the through passage in the rotary valve member, the off-setting of the opening in the end of the cylinder being towards said means for originating ignition.

4. A rotary valve assembly for an internal combustion engine compressor or the like comprising a valve housing located at the end of the engine cylinder and a rotary valve member mounted in the said housing, the said rotary valve member and housing having complementary tapered gas-sealing and bearing surfaces, said rotary valve member also having a through passage, said passage comprising substantially all of the combustion chamber of the engine when the piston is at its head-end dead-center position, one end of which passage is at the end of the valve member and is circular and concentric with the axis of rotation whilst being always open to the cylinder and the other end of which passage is located at the said tapered surface and co-operates with a port in the complementary tapered surface of the housing, the engine cylinder having an end wall with an opening towards the rotary valve member which is smaller than the adjacent end of the said rotary valve member and the area of which opening is substantially the area swept by the end of the passage in the said rotary valve member and is off-set relative to the axis of the cylinder.

5. A rotary valve assembly according to claim 4 characterised in that the cylinder opening towards the rotary valve member is circular and the same size as and concentric with the adjacent end of the passage in the said valve member.

6. A rotary valve assembly for an internal combustion engine compressor or the like comprising a valve housing located at the end of the engine cylinder, a rotary valve member mounted in the said housing, the said rotary valve member and housing having complementary tapered gas-sealing and bearing surfaces, said rotary valve member also having a through passage, said passage comprising substantially all of the combustion chamber of the engine when the piston is at its head-end dead-center position, one end of which passage is at the end of the valve member and is always open to the cylinder and the other end of which passage is located at the said tapered surface and co-operates with a port in the complementary tapered surface of the housing, and a baffle member adapted to be secured to the cylinder and forming the said end wall of the cylinder and having an opening towards the rotary valve member which is smaller than the adjacent end of the said rotary valve member and the area of which opening is substantially the area swept by the end of the passage in the said rotary valve member and is off-set relative to the axis of the cylinder, said baffle member being formed with an internal cooling space and provided with a jet for the admission of a cooling fluid with a directional factor towards the back face of the end wall portion of the baffle member, said jet extending through said cooling space and having an opening adjacent to the roof of said passage directly above the cylinder opening.

7. A rotary valve assembly for an internal combustion engine compressor or the like comprising a valve housing located at the end of the engine cylinder, a rotary valve member mounted in the said housing, the said rotary valve member and housing having complementary tapered gas-sealing and bearing surfaces, said rotary valve member also having a through passage, said passage comprising substantially all of the combustion chamber of the engine when the piston is at its head-end dead-center position, one end of which passage is at the end of the valve member and is always open to the cylinder and the other end of which passage is located at the said tapered surface and co-operates with a port in the complementary tapered surface of the housing, and a baffle member adapted to be secured to the cylinder and forming the said end wall of the cylinder and having an opening towards the rotary valve member which is smaller than the adjacent end of the said rotary valve member and the area of which opening is substantially the area swept by the end of the passage in the said rotary valve member and is off-set relative to the axis of the cylinder, the said baffle member being formed with an annular recess on the top face providing an upstanding flange around the opening therein and the end of the rotary valve member being formed with a complementary recess, the said flange having an annular groove in its outer face opposite said recess and fitted with a gas-sealing ring.

8. A rotary valve assembly for an internal combustion engine compressor or the like, comprising a valve housing located at the end of the engine cylinder and a rotary valve member mounted in the said housing, the said rotary valve member and housing having complementary tapered gas-sealing and bearing surfaces, said rotary valve member also having a through passage comprising substantially all of the combustion chamber of the engine when the piston is at its head-end dead-center position, one end of which passage is at the end of the valve member and is always open to the cylinder and the other end of which passage is located at the said tapered surface and co-operates with a port in the complementary tapered surface of the housing, the engine cylinder having an end wall with an opening towards the rotary valve member which is smaller than the adjacent end of the said rotary valve member and the area of which opening is substantially the area swept by the end of the passage in the said rotary valve member and is off-set relative to the axis of the cylinder, a piston in said cylinder, the upper face thereof being inclined, said end wall overhanging the lower part of said inclined face and being substantially contiguous therewith when said piston is in its uppermost position.

9. A rotary valve assembly for an internal combustion engine compressor or the like comprising a valve housing located at the end of the engine cylinder and a rotary valve member mounted in the said housing, the said rotary valve member and housing having complementary tapered gas-sealing and bearing surfaces, said rotary valve member also having a through passage comprising substantially all of the combustion chamber of the engine when the piston is at its head-end dead-center position, one end of which passage is at the end of the valve member and is always open to the cylinder and the other end of which passage is located at the said tapered surface and co-operates with a port in the complementary tapered surface of the housing, a spark plug in said housing which cooperates with said valve passage at timed intervals in the rotation of said valve, the engine cylinder having an end wall with an opening toward the rotary valve member which is smaller than the adjacent end of the said rotary valve member and the area of which opening is substantially the area swept by the end of the passage in the said rotary valve member and is off-set relative to the axis of the cylinder.

10. A rotary valve assembly for an internal combustion engine compressor or the like comprising a valve housing located at the end of the engine cylinder and a rotary valve member mounted in the said housing, the said rotary valve member and housing having complementary tapered gas-sealing and bearing surfaces, said rotary valve member also having a through passage comprising substantially all of the combustion chamber of the engine when the piston is at its head-end dead-center position, one end of which passage is at the end of the valve member and is always open to the cylinder and the other end of which passage is located at the said tapered surface and co-operates with a port in the complementary tapered surface of the housing, a spark plug in said housing which cooperates with said valve passage at timed intervals in the rotation of said valve, the engine cylinder having an end wall with an opening toward the rotary valve member which is smaller than the adjacent end of the said rotary valve member and the area of which opening is substantially the area swept by the end of the passage in the said rotary valve member and is off-set relative to the axis of the cylinder, said end wall being at the side of said cylinder opposite to said spark plug, the top surface of said piston being complementary to said cylinder end wall, and when said piston is in its upper position leaving only a thin space therebetween.

11. A rotary valve assembly for an internal combustion engine compressor or the like comprising a valve housing located at the end of the engine cylinder, a rotary valve member mounted in the said housing, the said rotary valve member and housing having complementary tapered gas-sealing and bearing surfaces, said rotary valve member also having a through passage comprising substantially all of the combustion chamber of the engine when the piston is at its head-end dead-center position, one end of which passage is at the end of the valve member and is always open to the cylinder and the other end of which passage is located at the said tapered surface and co-operates with a port in the complementary tapered surface of the housing and a baffle member adapted to be secured to the cylinder and forming the said end wall of the cylinder and having on opening towards the rotary valve member which is smaller than the adjacent end of the said rotary valve member and the area of which opening is substantially the area swept by the end of the passage in the said rotary valve member and is off-set relative to the axis of the cylinder, said baffle member having substantially parallel top and bottom faces, the bottom face resting on the top of said cylinder, the top face contacting with said valve housing, said top face of said baffle member constituting the upper portion of said cylinder and said end wall.

12. A rotary valve assembly for an internal combustion engine compressor or the like comprising a valve housing located at the end of the engine cylinder and a rotary valve member mounted in the said housing, the said rotary valve member and housing having complementary tapered gas-sealing and bearing surfaces, said rotary valve member also having a through passage, said passage comprising substantially all of the combustion chamber of the engine when the piston is at its head-end dead-center position, one end of which passage is at the end of the valve member and is always open to the cylinder and the other end of which passage is located at the said tapered surface and cooperates with a port in the complementary tapered surface of the housing, the engine cylinder having an end wall with an opening towards the rotary valve member which is smaller than the adjacent end of the said rotary valve member and the area of which opening is substantially the area swept by the end of the passage in the said rotary valve member, said end wall and the complementary top surface of said piston being correspondingly inclined, said passage being offset relative to the axis of said cylinder, the area between said end wall and surface being offset on the opposite side of said axis and away from the upper end of said passage when said valve is in position for detonation.

13. A rotary valve assembly for an internal combustion engine compressor or tne like comprising a valve housing located at the end of the engine cylinder and a rotary valve member mounted in the said housing, the said rotary valve member and housing having complementary tapered gas-sealing and bearing surfaces, said rotary valve member also having a through passage, said passage comprising substantially all of the combustion chamber of the engine when the piston is at its head-end dead-center position, one end of which passage is at the end of the valve member and is always open to the cylinder and the other end of which passage is located at the said tapered surface and cooperates with a port in the complementary tapered surface of the housing, the engine cylinder having an end wall with an opening towards the rotary valve member which is smaller than the adjacent end of the said rotary valve member and the area of which opening is substantially the area swept by the end of the passage in the said rotary valve member, said end wall and the complementary top surface of said piston being correspondingly inclined, said passage being offset relative to the axis of said cylinder, the area between said end wall and surface being offset on the opposite side of said axis and away from the upper end of said passage when said valve is in position for detonation, and a space in said offset portion of said end wall for the circulation of cooling fluid.

FRANK METCALF ASPIN.

REFERENCES CITED

The following references are of record in the file of this patent:

UNITED STATES PATENTS

| Number | Name | Date |
|---|---|---|
| 1,153,675 | Coffin | Sept. 14, 1915 |
| 2,305,874 | Isley | Dec. 22, 1942 |
| 1,775,581 | Baer | Sept. 9, 1930 |
| 1,071,686 | Batzel | Sept. 2, 1913 |
| 2,327,470 | Tjaarda | Aug. 24, 1943 |
| 1,853,433 | King | Apr. 12, 1932 |
| 1,923,666 | French | Apr. 22, 1933 |
| 2,254,438 | McCarthy | Sept. 2, 1941 |
| 1,227,698 | Tibbetts | May 29, 1917 |
| 1,579,098 | Fedden | Mar. 30, 1926 |